May 20, 1930.   C. W. CROES   1,759,544
MAP HOLDER
Filed Feb. 23, 1929   2 Sheets-Sheet 2
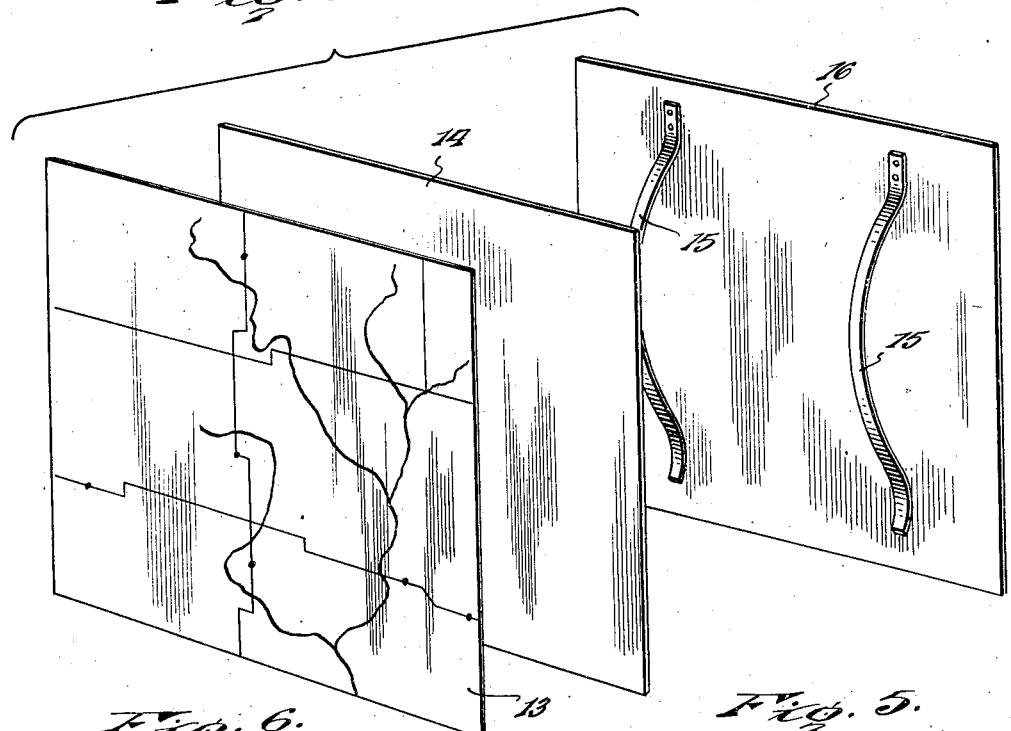
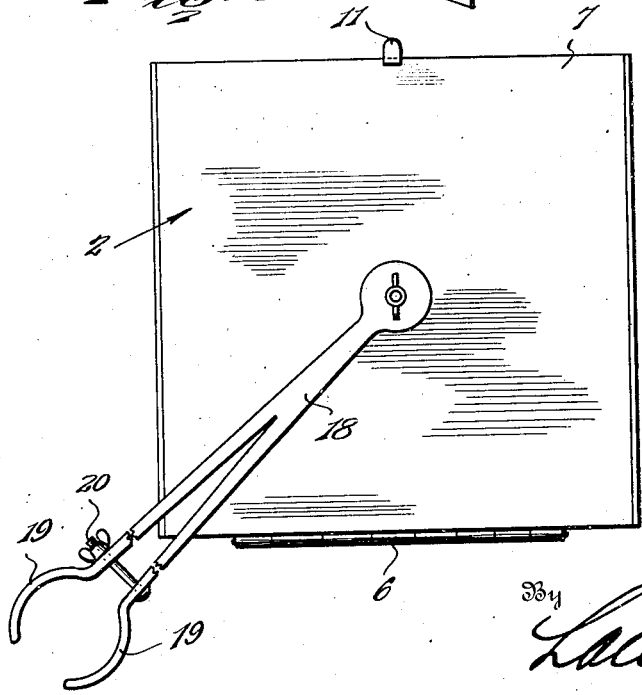
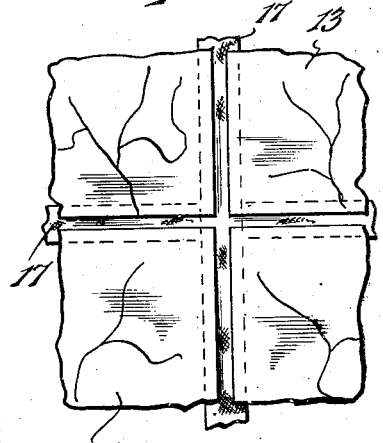
Inventor
C. W. Croes.
By Lacey & Lacey, Attorneys Patented May 20, 1930

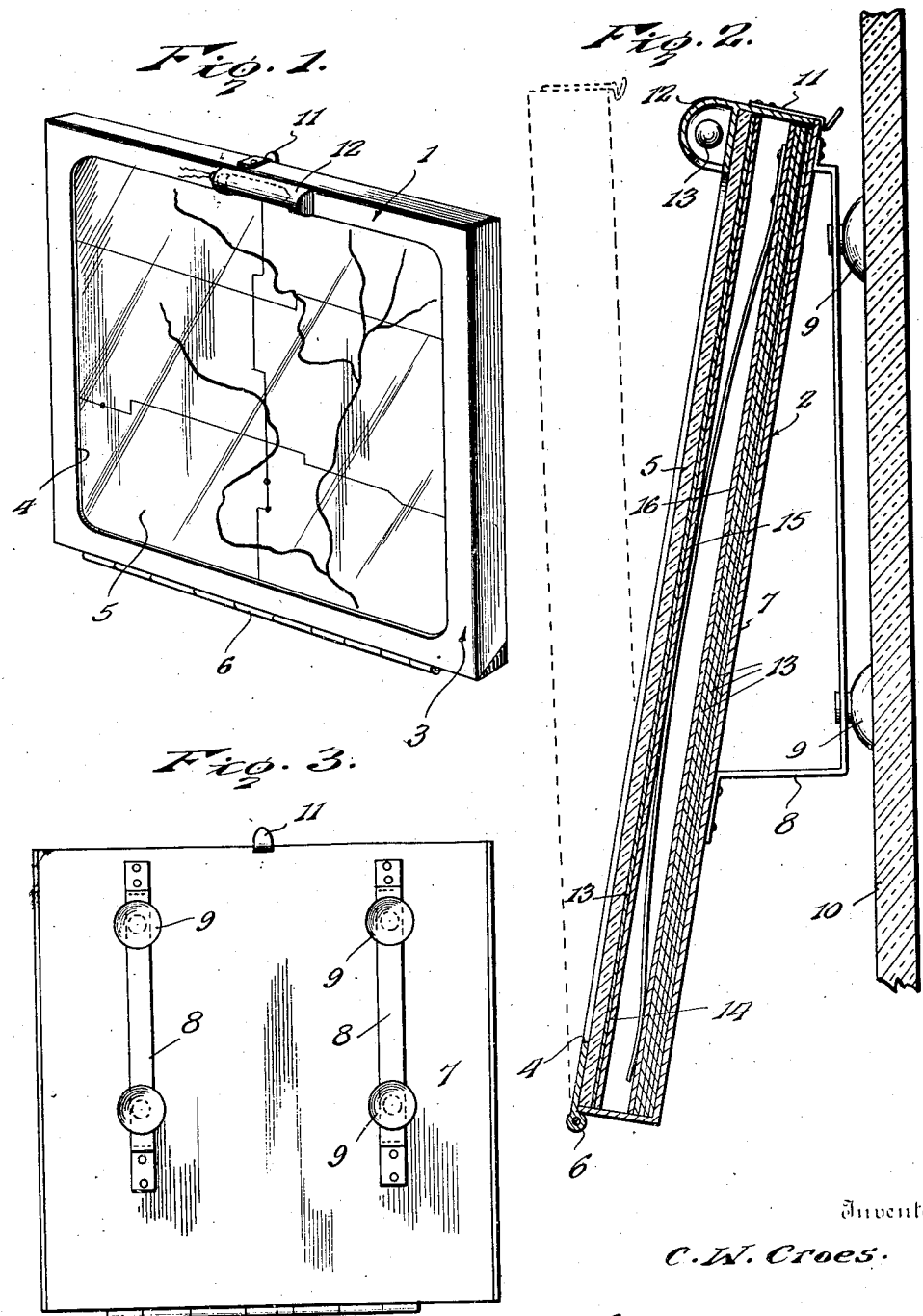

1,759,544

UNITED STATES PATENT OFFICE

CHARLES W. CROES, OF ABERDEEN, SOUTH DAKOTA

MAP HOLDER

Application filed February 23, 1929. Serial No. 342,126.

The present invention is directed to improvements in map holders.

The primary object of the invention is to provide a device of this character primarily designed for holding road maps used by motorists, the construction being such that a map of the locality being traveled will be conveniently displayed for observation by the driver.

Another object of the invention is to provide a holder of this nature so constructed that access can be conveniently had to the maps contained therein in order that said maps may be quickly interchanged as occasion requires.

Another object of the invention is to provide a device of this type constructed and arranged in such manner that it can be supported by the windshield of the vehicle or by the steering column thereof.

Another object of the invention is to provide means whereby the map being used will be held flat against the glass panel of the holder so that the route displayed thereon will at all times be clearly visible.

Another object of the invention is to provide a device of this character which is simple in construction, durable, efficient in operation, and one which can be manufactured at a small cost.

With these and other objects in view, the invention resides in the novel features of construction, formation, combination and arrangement of parts to be hereinafter more fully described, claimed, and illustrated in the accompanying drawings, in which:

Figure 1 is a perspective view of the device.

Figure 2 is a vertical sectional view through the same, showing it secured to the windshield of a motor vehicle.

Figure 3 is a rear view of the holder.

Figure 4 is a perspective view showing a map card and the plates in non-assembled relationship.

Figure 5 is a fragmentary view of the map cards showing the same hingedly connected.

Figure 6 is a rear view of the holder, showing it equipped with an arm for attachment to the steering column of a vehicle.

The holder comprises a casing 1, preferably formed of light sheet metal, and includes a back section 2 and a cover section 3, the latter having an opening 4 formed therein which is closed by the transparent panel 5. The cover section 3 has its lower edge connected to the lower end of the back section by a hinge structure 6 in order that the cover section may be conveniently opened or closed.

The back 7 of the section 2 has secured thereto a pair of brackets 8 and to each bracket is secured a pair of rubber vacuum cups 9 for attachment to the windshield 10 of a motor vehicle whereby the holder can be suspended in a position for convenient observation by the driver of the vehicle.

The cover section has a resilient latch 11 carried by its upper end. This latch is adapted to snap into engagement with the upper edge of the back 7, and obviously serves to retain the cover section in its closed position.

The cover section is further provided upon its upper end with a casing 12 in which is mounted an incandescent bulb 13 in order that the face of the map card 13 bearing against the panel 5, may be illuminated at night.

A number of the map cards 13 are retained in the holder, one of which is placed against the rear face of the panel 5. When it is necessary to observe another card, the cover section is opened and a reserve card is substituted for the one previously used. The map cards 13 will obviously have printed thereon maps of various localities and routes, and may be formed from paper, cardboard, or fabric, as desired.

In order to hold the map card 13 being used, firmly against the rear face of the panel 5, a sheet metal plate 14 is provided and is placed against the rear face of the card in order to hold the same tight against the panel so that all parts will be visible and legible. This plate is yieldably held against the map card by bowed springs 15, said springs having their upper ends fixed to the metallic plate 16, the lower ends of said springs being slidable on said plate. The plate 16 will serve to hold the reserve map cards tightly packed. It will thus be seen that the various map cards will be maintained in a flat state to prevent wrinkling and warping thereof.

If desired, the map cards can be united by a fabric strip 17, as shown in Figure 5, so that they may be arranged in folder form in the holder. It will be obvious that the plates 14 and 16 can then be placed between the back plate 7 and the folded map cards to hold the map being used firmly against the panel 5.

If desired, the holder can be supported by the steering column of the car and in order to accomplish this an arm 18 is provided and is adjustably bolted to the back 7 of the holder, as shown in Figure 6 of the drawings. The arm 18 is provided with a pair of jaws 19 adapted to clamp upon the steering column and retained thereon by the clamping bolt 20.

I have illustrated the holder as capable of being attached to the windshield or steering column of the vehicle but it will, of course, be understood that by minor changes the casing can be supported upon the instrument board or any other part of the vehicle found desirable.

I do not wish to be limited to the use of specially prepared map cards since various commercial types of maps can be conveniently placed in the casing.

From the foregoing, it is thought that the construction, operation and many advantages of the herein described invention will be apparent to those skilled in the art, without further description, and it will be understood that various changes in the size, shape, and proportion and minor details of construction may be resorted to without departing from the spirit or sacrificing any of the advantages of the invention.

What is claimed is:

A map holder comprising a back section and a cover section constituting a casing for receiving a plurality of individual maps, the cover section having a sight opening, a transparent panel closing the opening, plates mounted in the casing between the maps, and yieldable means urging the plates apart to hold one map flat against the panel.

In testimony whereof I affix my signature.

CHARLES W. CROES. [L. S.]